(12) United States Patent
Kawai et al.

(10) Patent No.: US 7,854,982 B2
(45) Date of Patent: Dec. 21, 2010

(54) HONEYCOMB STRUCTURE FOR SLURRY COATING

(75) Inventors: Hironao Kawai, Kakegawa (JP); Masakazu Murata, Kariya (JP)

(73) Assignees: Cataler Corporation, Kakegawa (JP); Denso Corporation, Kariya (JP)

( * ) Notice: Subject to any disclaimer, the term of this patent is extended or adjusted under 35 U.S.C. 154(b) by 0 days.

(21) Appl. No.: 12/225,117

(22) PCT Filed: Jun. 27, 2007

(86) PCT No.: PCT/JP2007/062859

§ 371 (c)(1), (2), (4) Date: Sep. 15, 2008

(87) PCT Pub. No.: WO2008/007546

PCT Pub. Date: Jan. 17, 2008

(65) Prior Publication Data

US 2010/0035752 A1 Feb. 11, 2010

(30) Foreign Application Priority Data

Jul. 13, 2006 (JP) .............................. 2006-192467

(51) Int. Cl.
*B32B 3/12* (2006.01)

(52) U.S. Cl. ...................................... 428/116

(58) Field of Classification Search ........................ None
See application file for complete search history.

(56) References Cited

U.S. PATENT DOCUMENTS

| | | | |
|---|---|---|---|
| 4,284,675 A | | 8/1981 | Sakai et al. |
| 4,849,275 A | * | 7/1989 | Hamaguchi et al. ......... 428/116 |
| 6,087,281 A | | 7/2000 | Merkel |
| 6,254,963 B1 | | 7/2001 | Kondo |

FOREIGN PATENT DOCUMENTS

| | | |
|---|---|---|
| JP | A-54-017388 | 2/1979 |
| JP | A-63-197550 | 8/1988 |
| JP | A-08-299791 | 11/1996 |
| JP | A-2000-001365 | 1/2000 |
| JP | A-2000-239059 | 9/2000 |
| JP | 2002-191985 | 7/2002 |
| JP | A-2002-191985 | 7/2002 |
| JP | A-2005-279436 | 10/2005 |
| JP | A-2007-136357 | 6/2007 |

* cited by examiner

OTHER PUBLICATIONS

English language translation of Chinese Office Action mailed Dec. 25, 2009.

*Primary Examiner*—Gordon R Baldwin
(74) *Attorney, Agent, or Firm*—Oliff & Berridge, PLC

(57) ABSTRACT

With the recent yearly increase in cell density, use of the same slurry as a conventional one for forcibly depositing a solid, e.g., alumina for supporting, on the surface of cell walls has come to arouse a trouble that the resultant coat layer is thick and cell clogging is more apt to occur. When a slurry whose viscosity has been reduced by reducing the binder amount is used, the slurry which has flowed into cells is discharged without leaving a solid adherent to the surface of the cell walls. Namely, it is difficult to secure a desired solid deposition amount. A honeycomb structure for slurry coating is provided which is made of a porous object, wherein the surface of cell walls formed in the structure has fine pores dispersedly formed therein and having a pore diameter of 2 μm or smaller. Preferably, the total volume of the fine pores is 0-0.17 ml, excluding 0 ml, per g of the structure.

2 Claims, 3 Drawing Sheets

(1)

(2)

(1)

(2)

(1)

(2)

HONEYCOMB STRUCTURE FOR SLURRY COATING

TECHNICAL FIELD

The present invention relates to a honeycomb structure including cells therein, over which slurry is to be coated, and more particularly a honeycomb structure to be used preferably as a substance for catalysis for converting exhaust gas.

THE BACKGROUND OF THE INVENTION

Structures as substances for catalysis for converting exhaust gas are typically formed of ceramic materials. In terms of reduction in pressure loss and thermal capacity to provide premature activation of catalyst, recently, reduction in thickness of cell walls has been requested. The thicknesses of the cell walls were in '80th, amount to around 0.15 mm (6 mil). The thickness of the cell walls, however, has been reduced nowadays to around 0.05 mm (2 mil).

On the other hand, the thickness reduction of the cell walls deteriorates the mechanical strength of the structures. This point has been compensated for by reducing the porosity of the structure to heighten the density. In the dense structure, the surface area of each cell is decreased, whereby it becomes difficult to deposit solids as catalyst carrier on the substances. This point has been compensated for by increasing the viscosity of the slurry, lowering the drawing speed of the slurry when flowing the slurry into the cells, lowering the blowing off speed of excess amount of the slurry from the cells, and so on.

Cross-reference: Japanese Laid-open public disclosure 2005-279436

DISCLOSURE OF THE INVENTION

The Object or Objects to be Solved by the Present Invention

In recent years, with strengthen of exhaust gas controls, more and more improved converting function is required, so that the cell density of the structure has been increased year by year to 400 cells/in$^2$, 600 cells/in$^2$, and 900 cells/in$^2$. Accordingly, if conventional slurries are used, forcibly depositing a desired amount of solids as a support, e.g., alumina provides use of a large amount of slurry, thus thickening a resultant coat layer. Thickening the coat layer is more likely to occur cell clogging. Especially, as catalyst for automotive exhaust gas conversion, the slurry includes precious metals so that economic disadvantages become substantially high, if the cell clogging occurs.

In order to reduce the thickness of the coat layer, many countermeasures had been taken. There are countermeasures such as reducing the binder content in the slurry, reducing the solid content in the slurry, and/or adjusting the pH of the slurry to lower the viscosity thereof. However, if such countermeasures are taken, solids such as alumina become apt to settle in the slurry. Accordingly, it is required to stir the slurry always before coating. This leads to the additional expense on the management of the slurry. Further, when delivering the slurry through the cells, namely coating the slurry on the cells, the solids are apt to be discharged without being left and deposited on the surface of the cell wall. Therefore, it becomes difficult to deposit the solid to a desired amount.

In order to solve the above-mentioned problems, it is an object of the invention to provide a honeycomb structure, which is superior in its properties to be coated by slurry.

The Means for Solving the Objects

The present inventors had noted relationship between the size of fine pores formed in the cell wall and the being coated properties, and repeated trial and error. As a result, the inventors has successfully found that micro fine pores having diameters of 2 μm (micrometer) or less are closely related to the being coated properties. That is to say, if micro fine pores having diameters 2 μm or less are formed and dispersed in the cell wall surface, larger amounts of slurry is coated on the cell walls by one coating operation. Based on this finding, there is provided a present invention of a honeycomb structure.

The honeycomb structure of the present invention is not intended to be limited to substances for catalytic converter for converting exhaust gas, but also may be also applied to other applications, provided that some slurry is coated.

In accordance with the present invention, there is provided a first aspect of a honeycomb structure for slurry coating as claimed in claim 1, wherein the structure has a porous body of many cells, each cell wall having a plurality of micro fine pores with diameters of 2 μm or less formed and dispersed in the cell wall surface.

According to a second aspect, there is provided the honeycomb structure for slurry coating as recited in the first aspect, wherein the total volume of the micro fine pores falls within the range of more than 0 ml and less than or equal to 0.17 ml per 1 g of the structure.

According to a third aspect, there is provided the honeycomb structure for slurry coating as claimed in claim 1 or 2, wherein the structure is for use as a substance for catalysis for converting exhaust gas.

THE EFFECTS TO BE DERIVED FROM THE PRESENT INVENTION

According to the present invention, there is provided a honeycomb structure which is superior in its properties to be coated by slurry.

THE DESCRIPTIONS ON REFERENCE NUMERALS

1 . . . honeycomb structure
3 . . . cell
5 . . . cell wall
7 . . . micro fine pores
r . . . pore diameter
v . . . total volume

DETAILED DESCRIPTION OF THE INVENTION

Figure 1:
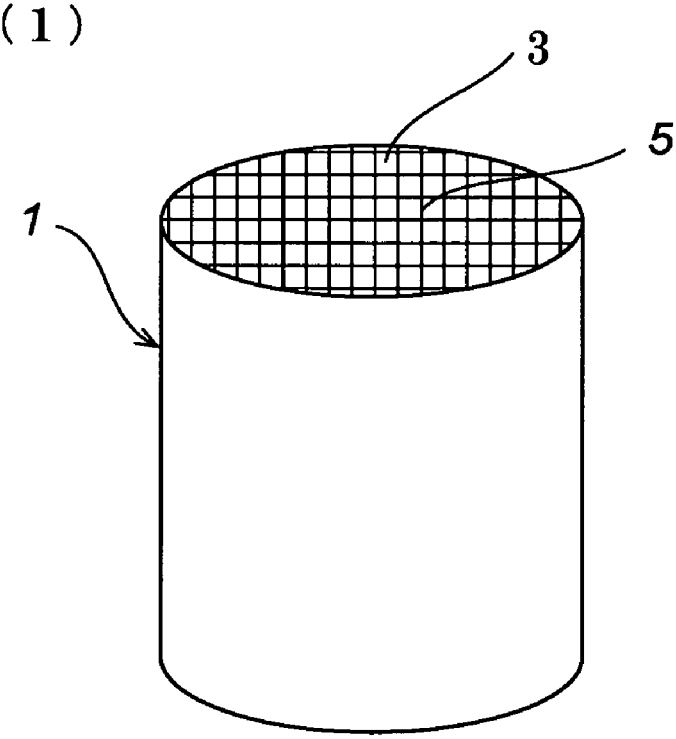
FIG. 1 shows a honeycomb structure of an embodiment in accordance with the present invention, in which FIG. 1(1) is a perspective view of the whole honeycomb structure, and FIG. 1(2) is an enlarged cross-sectional view of the cell wall of the honeycomb structure.
Figure 1:
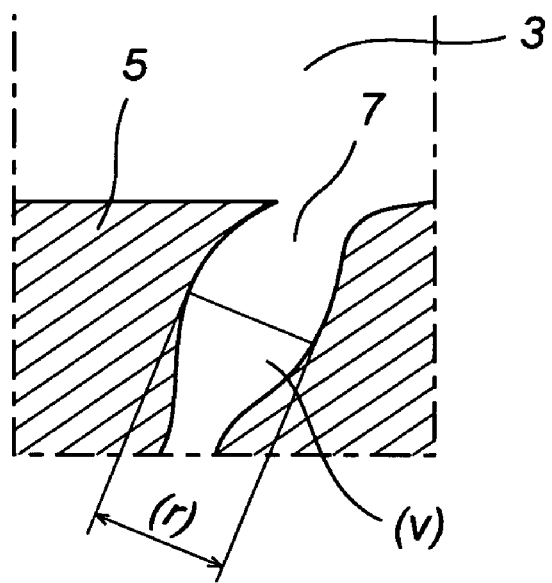

The present invention will now be described with reference to the embodiment as shown in FIG. 1.

The honeycomb structure 1 of the present invention has a porous body of many cells. There are no limitations on the porous body inasmuch as micro fine pores of 2 μm or less diameters can be formed in the cell wall. The honeycomb structure 1 may be made suitably of ceramics such as cordierite.

Although on configuration of the honeycomb structure 1, there are no substantial limitations, the following description will be made with reference to the honeycomb structure of cylindrical configuration as shown in FIG. 1(1). Such configuration ones are used generally in catalytic converter for converting automotive exhaust gas. The honeycomb structure 1 has a plurality of cells 3 formed therein. The cells 3 are separated by cell walls 5. The cells 3 serve as gas passages, extending longitudinally through both end faces of the structure.

A plurality of open fine pores is formed in the surfaces of each cell wall 5, as shown in FIG. 1(2). It is characterized in that the honeycomb structure 1 has micro fine pores 7 of 2 μm or less diameters (=pore diameter (r)) formed and dispersed in the cell wall surface. That is to say, the honeycomb structure 1 has special micro fine pores among the open fine pores.

In the honeycomb structure 1, a large amount of slurry is coated on the cell walls 5 only by one coating operation. This is because the micro fine pores 7 distributed in the surface of the cell wall 5 cell cause the slurry to be secured thereon. In this connection, slurries of lower viscosity may be used in the present invention, and so-called cell clogging phenomena caused by use of high viscosity slurry is prevented.

Further, in the honeycomb structure 1, the micro fine pores 7 are distributed substantially uniformly over the surface of the cell wall 5 so that the slurry can also be coated uniformly thereon.

It is preferable that the total volume (v) of the micro fine pores 7 of 2 μm or less diameters per 1 g of the structure 1 falls within the range of more than 0 ml and less than or equal to 0.17 ml. The value of the lower limit i.e. 0 (=zero) ml of this range of volume (v) can of course be excluded, since it means that there are present no micro fine pores 7 in the structure. It is preferred to set the lower limit of the volume to 0.01 ml, in order to efficiently enhance the properties to be coated by slurry. On the other hand, although there are no substantial limitations on the upper limit of the porosity, the upper limit of the total volume (v) of the micro fine pores 7 is preferably 0.17 ml, and more preferably 0.14 ml, since the larger the total volume, the more the total coat amount deposited on the cell wall 5 and the cell clogging is more apt to occur.

The cell walls 5 may further include fine pores larger than the micro fine pores 7, such as those of more than 2 μm diameters.

However, in order to make control of the coat amount of slurry on the cell wall 5 easier, it is preferable that the percentage of the micro fine pores 7 of 2 μm or less diameters is formed and dispersed in the cell wall 5 at more than 74 vol. % among the total pore volume, and more preferably more than 90 vol. %.

The honeycomb structure 1 of the present invention may be produced of known materials and through known methods of production, depending on pores to be formed within the cell wall 5 (i.e. the diameter of the pores and the total volume of the pores).

The micro fine pores 7 are formed by mixing combustible with raw material which makes the honeycomb structure 1, forming a honeycomb structure, burning the structure while burning off or volatizing the combustible to leave a plurality of voids, as micro fine pores. The micro fine pores may be desirably made by suitably selecting raw material, adjusting a maximum temperature of the burning operation, a duration period of the maximum temperature, and a rate of heating and cooling and the like.

There are no limitations on ingredients to be contained in the slurry. Accordingly, although slurries of well-known compositions may be used, there may be also used slurries containing reduced amounts of binders. That is, slurries of lower viscosities may be used, since enhanced is the being coated properties, or the deposit properties of the solids on the cell wall 5 of the honeycomb structure 1.

If there is used a slurry containing solids of binder and support at the wide range of 15 to 58 wt. %, the deposit amount of the solids is depend on the presence of the micro fine pores of 2 μm or less diameters (r).

Further, there are also no limitations on method for delivering slurry into the cells 3. The coating operation of the cell wall 5 by slurry may be made either by pouring the slurry from the axially upper end surface of the honeycomb structure 1 or by pushing up the slurry from the bottom end surface and removing the excess amount of slurry by pushing down or blowing off the slurry from the structure upon sensing the overflow of the slurry from the upper end surface of the structure.

An embodiment of the present invention had been described hereinabove. Although the description above contains much detail, these should not be construed as limiting the scope of the invention but merely providing illustrations of any of the presently preferred embodiments of the invention.

The First Example

Figure 2:
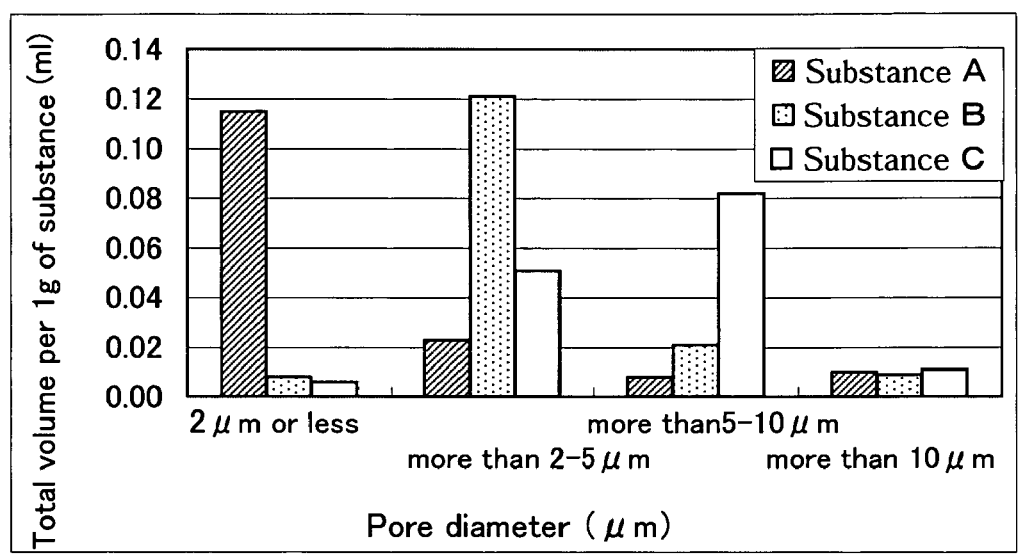
FIG. 2 explains example 1, in which FIG. 2(1) is a graph showing the relationship between the diameters and the total volume of fine pores on each substance, and FIG. 2(2) is a graph showing the coat amount of slurry applied onto each substrate.
Figure 2:
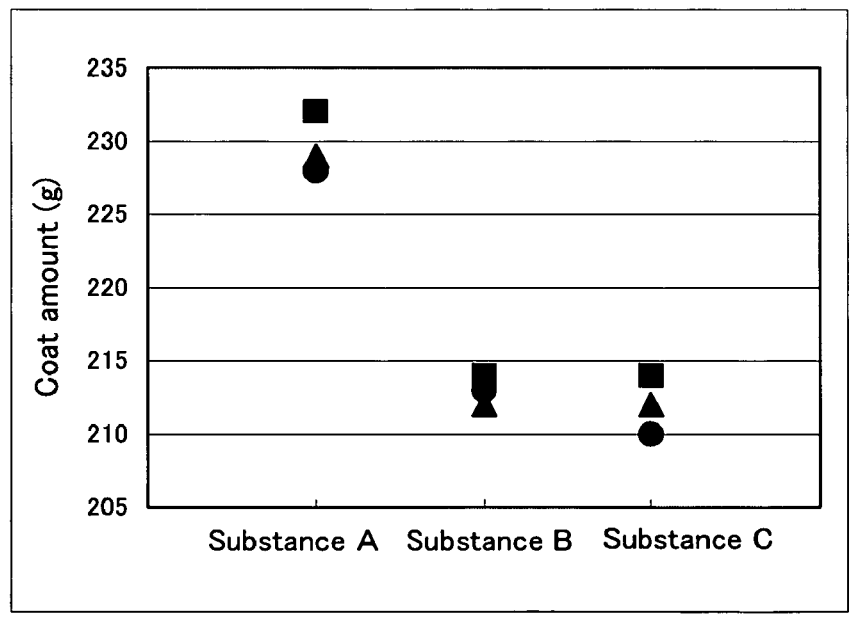

The cordierite honeycomb structures 1 were produced by forming and burning, as three substances A, B, and C, respectively. In each substance, the thickness of the cell walls of was adjusted to 0.05 mm (2 mil) and the density of the cells was adjusted to 900 cells/in$^2$, which corresponds to substances employed presently for catalyst converter. These substances were treated differently in their maximum burning temperature of burning from 1390° C. to 1450° C. Thus, so obtained substances had various fine pores in pore diameters (r), and the total volume (v) by each group classified by pore diameter, as shown in FIG. 2(1)

For the convenience of comparison, the total volume (v) of each substance were adjusted to be more than 0 ml and less than or equal to 0.17 ml.

In the case of the substance A, the content of the micro fine pores of 2 μm or less diameters was 74 vol. % in the total volume thereof. In the case of the substance B, the content of the micro fine pores of 2 μm or less diameters was 5 vol. % in the total volume thereof. In the case of the substance C, the content of the micro fine pores of 2 μm or less diameters was 4 vol. % in the total volume thereof.

Slurry to be coated or deposited contained supports such as aluminum oxide with cerium oxide and zirconium oxide, the sum of which was 45 wt. %, and an inorganic binder at 2 wt. %. That is, the total amount was 47 wt. %. At first, the slurry was poured into the cells 3 from the axially upper end surface thereof, and the excess amount of slurry was removed therefrom, and then the slurry was dried and burned. These operations were made on each substrate under the same conditions.

The coat amounts (g) on the substances were calculated from the difference in its weight before and after the coating onto the substances. As can be seen from FIG. 2(2), the coat amount onto the substance A was the greatest. The cost amounts onto the other two substrates were substantially decreased and the there are substantially no difference therebetween.

These results prove that the coat amount onto the substances depend substantially on the existence of the micro fine pores of 2 μm or less diameters (r). In other words, a large amount of solids as a support can be coated or deposited onto the cell walls evenly and stably, even if the slurry of relatively lower viscosity is used in spite of relatively higher viscosity ones.

The Second Example

The cordierite honeycomb structures 1 were produced conventionally by forming and burning as substances. In each substance, the thickness of the cell wall was adjusted to 0.05 mm (2 mil) and the density of the cells was adjusted to 900 cell/in$^2$, which corresponds to substances employed presently for catalyst converter. These substances were treated differently in their maximum burning temperature of burning from 1390° C. to 1450° C. Thus, so obtained substances were different with each other in the total volume of the micro fine pores.

For the convenience of comparison, on all of the substances, the fine pores were all made at 2 μm or less diameters (r).

Two kinds of slurries (1) and (2) were prepared. The slurry (1) contained a support such as aluminum oxide with cerium oxide and zirconium oxide, the sum of which is 45 wt. %, and inorganic binder at 2 wt. %. The total amount was 47 wt. %. The slurry (2) contained a support such as aluminum oxide at 42 wt. %, and inorganic binder at 2 wt. %. The total amount was 44 wt. %. At first, the slurry was poured into the cells 3 from the axially upper end surface thereof, and the excess amount of slurry was removed therefrom, and then the slurry was dried and burned. These operations were made on each substance under the same conditions.

Figure 3:
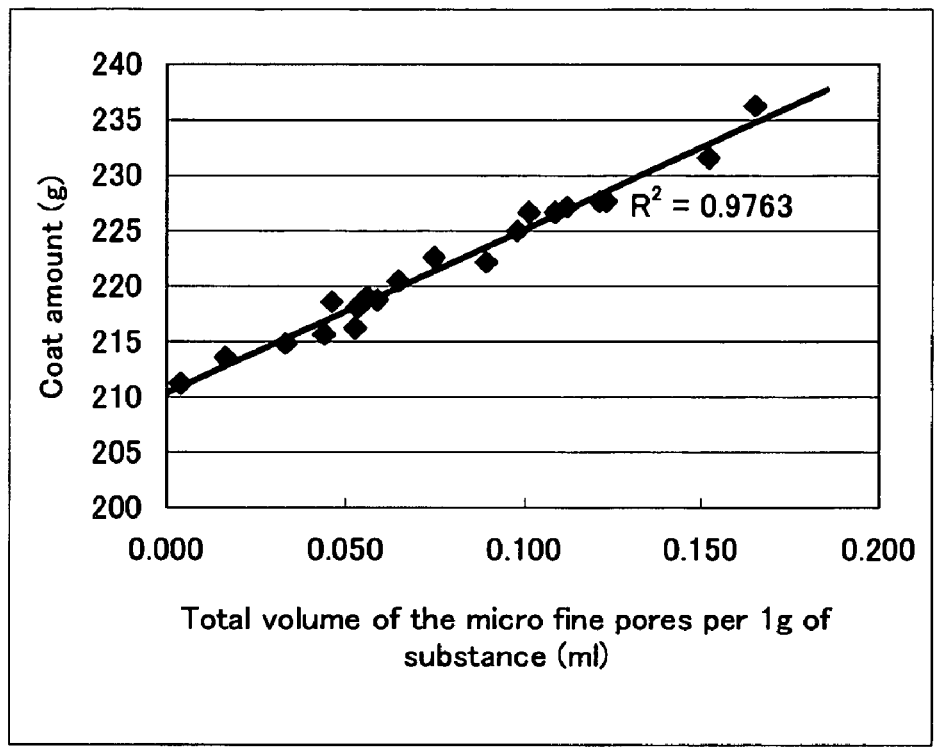
FIG. 3 explains example 2, and is a graph showing the relationship between the total volume of micro fine pores and the coat amount of slurry.
Figure 4:
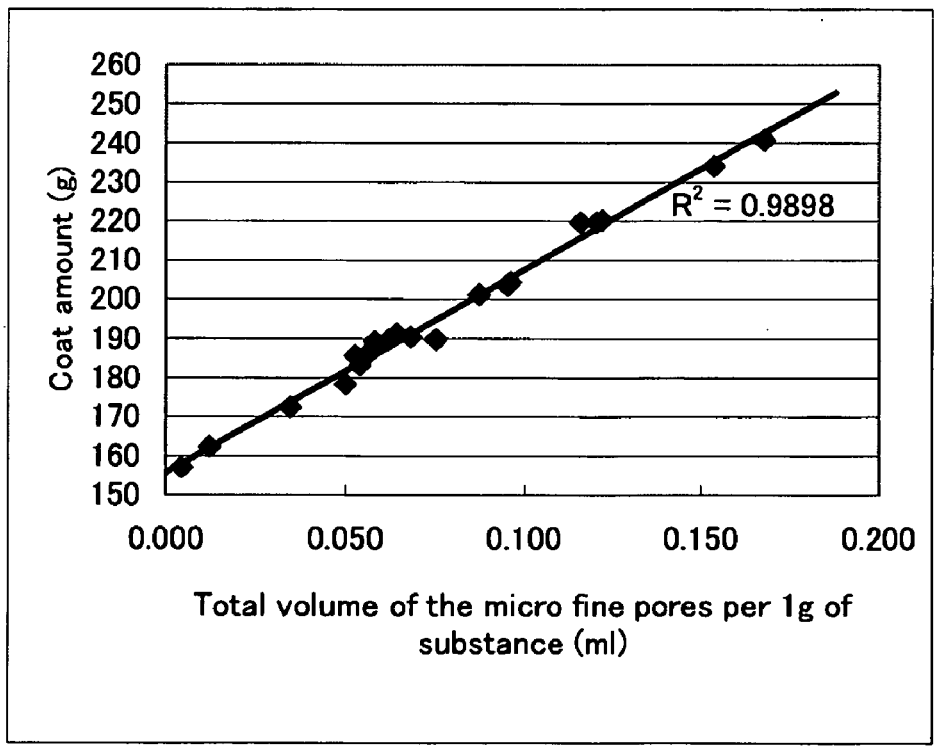
FIG. 4 explains example 2, and is a graph showing the relationship between the total volume of micro fine pores and the coat amount of slurry.

The relationship between the total volume of the micro fine pores per 1 g of substance and the coat amount is illustrated in FIG. 3 with respect to the slurry (1). The relationship between the total volume of the micro fine pores per 1 g of substance and the coat amount is illustrated in FIG. 4 with respect to the slurry (2).

The coat amount (g) onto the substance was calculated from the difference in its weight before and after the coating. The results obtained on the slurries (1) and (2) were seen in the plots as shown in FIGS. 3 and 4, respectively. Under the regression analysis on the obtained data, it was found that there is a positive correlation between the total volume of the micro fine pores per 1 g of the substance and the coat amount. Thus the linear regression lines were also obtained as shown in FIGS. 3 and 4. The coefficient of decision, square ($R^2$) calculated from the coefficient of correlation (R), was as follows. In the case of the slurry (1), there was $R^2$=0.9763, and in the case of the slurry (2), there was $R^2$=0.9898. Both were closer to 1. This means that the strong correlation is present.

It might be understand that there is a strong positive correlation when the total volume (v) of the micro fine pores of 2 μm or less diameters (r) is present within the range of more than 0 ml and less than or equal to 0.17 ml. In other words, the coat amount of the slurry on the cell walls is enhanced by increasing the total volume (v) of the micro fine pores of 2 μm or less diameters, and the coat amount of the slurry is reduced by decreasing the total volume (v) of the fine pores of 2 μm or less diameters. Thus the coat amount of the slurry is adjustable easily as desired.

INDUSTRIAL APPLICABILITY

In the honeycomb structure of the present invention, the deposit of solids in the slurry can be enhanced merely by adjusting the size of the fine pores distributed in the structure. The adjustment of the size of the fine pores can be effected by controlling the temperature of burning operation on the structure and the like, so that no further facilities are therefor required. Further, the coat amount of the slurry onto the structure (namely, onto the cell walls) can also be adjusted by controlling the number of micro fine pores and/or the total volume thereof. This is because the coat amount of the slurry onto the structure depends strongly on the micro fine pores of 2 μm or less diameters.

Recently, the thickness of the cell walls become reduced and the density of the cell become increased more and more, so that the cell clogging is more likely to occur. In the above mentioned honeycomb structure, a desired amount of solids can be deposited on the structure even if a slurry is used with the blinder being contained at relatively small amount, compared with the prior art ones. In this connection, the problem of the cell clogging leading to the economic loss can reliably be prevented, if the structure of the invention is used.

What is claimed is:

1. A honeycomb structure for slurry coating, wherein the honeycomb structure comprises a porous body of a plurality of cells, each cell wall of the plurality of cells having a plurality of micro fine pores with diameters of 2 μm or less formed and dispersed in a cell wall surface,
    wherein a total volume of the micro fine pores is within the range of from 0.14 ml to 0.01 ml per 1 gram of the honeycomb structure,
    wherein the micro fine pores are formed and dispersed in the cell wall surface at an amount greater than or equal to 74 vol % of a total pore volume, and
    wherein a cell density of the honeycomb structure is 900 cells/in$^2$ or greater.

2. The honeycomb structure for slurry coating as claimed in claim 1, wherein the structure is a substance for catalysis for converting exhaust gas.

* * * * *